(12) United States Patent
Harris

(10) Patent No.: US 12,728,723 B2
(45) Date of Patent: Sep. 8, 2026

(54) VEHICLE DRIVE TRAIN CONTROL INTERFACE

(71) Applicant: GHSP, INC., Holland, MI (US)

(72) Inventor: Richard W. Harris, Wyoming, MI (US)

(73) Assignee: GHSP, INC., Holland, MI (US)

( * ) Notice: Subject to any disclaimer, the term of this patent is extended or adjusted under 35 U.S.C. 154(b) by 132 days.

(21) Appl. No.: 18/552,502

(22) PCT Filed: Mar. 21, 2022

(86) PCT No.: PCT/IB2022/052567
§ 371 (c)(1),
(2) Date: Sep. 26, 2023

(87) PCT Pub. No.: WO2022/208228
PCT Pub. Date: Oct. 6, 2022

(65) Prior Publication Data

US 2024/0367518 A1 Nov. 7, 2024

Related U.S. Application Data

(60) Provisional application No. 63/167,990, filed on Mar. 30, 2021.

(51) Int. Cl.
*B60K 35/00* (2024.01)
*B60K 20/06* (2006.01)
*B60K 35/10* (2024.01)

(52) U.S. Cl.
CPC .............. *B60K 35/10* (2024.01); *B60K 20/06* (2013.01); *B60K 2360/126* (2024.01)

(58) Field of Classification Search
CPC .......... G05G 2009/04781; G05G 2009/04777; G05G 9/047; F16H 2059/081;
(Continued)

(56) References Cited

U.S. PATENT DOCUMENTS 5,161,422 A * 11/1992 Suman .................... B60R 25/06 180/315
5,330,030 A * 7/1994 Eastman ................ B60K 23/08 180/247
(Continued)

FOREIGN PATENT DOCUMENTS

EP 1471291 B1 6/2016
JP 2004324676 A 11/2004
(Continued)

*Primary Examiner* — Zakaria Elahmadi
(74) *Attorney, Agent, or Firm* — Price Heneveld LLP

(57) ABSTRACT

A selection assembly includes a primary interface that is operable in at least two directions of movement. A user interface is incorporated within the primary interface and having a selector that is operable relative to the primary interface. The selector includes operative movement along a primary movement path to select between a first transmission setting and a second transmission setting. The selector includes a secondary movement path that deviates from the primary movement path. A combination of the primary movement path and the secondary movement path operate the selector between the second transmission setting and a third transmission setting.

20 Claims, 5 Drawing Sheets

(58) Field of Classification Search
CPC .. F16H 2059/0239; F16H 59/02; F16H 59/08; B60K 35/10; B60K 20/06; B60K 2360/126
See application file for complete search history.

(56) References Cited

U.S. PATENT DOCUMENTS

| | | | | |
|---|---|---|---|---|
| 5,655,618 | A * | 8/1997 | Wilson | B60K 17/344 180/197 |
| 6,151,977 | A * | 11/2000 | Menig | B60K 20/06 74/473.18 |
| 6,360,624 | B1 * | 3/2002 | Sedlmaier | F16H 59/105 74/335 |
| 6,945,349 | B2 | 9/2005 | Colling et al. | |
| 7,033,303 | B2 | 4/2006 | Takasaki et al. | |
| 8,789,439 | B2 * | 7/2014 | Tovar | B60T 7/085 74/473.19 |
| 10,100,919 | B1 * | 10/2018 | Turney | F16H 59/0217 |
| 11,014,450 | B2 | 5/2021 | Keenan et al. | |
| 2003/0000763 | A1 * | 1/2003 | Colling | F16H 59/0204 180/333 |
| 2005/0274217 | A1 * | 12/2005 | Dubay | F16H 59/105 74/473.12 |
| 2006/0169085 | A1 * | 8/2006 | Peuster | F16H 59/0204 74/473.12 |
| 2010/0262347 | A1 * | 10/2010 | Murota | B60K 23/08 701/69 |
| 2017/0113513 | A1 * | 4/2017 | Yanatsubo | G06F 3/04847 |
| 2017/0227117 | A1 * | 8/2017 | Lumetta | F16H 59/0204 |
| 2018/0244155 | A1 * | 8/2018 | Keenan | B60K 35/60 |

FOREIGN PATENT DOCUMENTS

| | | | |
|---|---|---|---|
| JP | 2003518464 | A | 1/2011 |
| KR | 20130042353 | A | 4/2013 |
| WO | 2006083221 | A1 | 8/2006 |

* cited by examiner

VEHICLE DRIVE TRAIN CONTROL INTERFACE

FIELD OF THE DISCLOSURE

The present disclosure generally relates to user interface controls within a vehicle setting. More specifically, the device is in the field of a drive-train control that is incorporated within various user interface configurations that provide convenient user access during operation of the vehicle.

BACKGROUND OF THE DISCLOSURE

Within vehicles, various user interface assemblies are incorporated for modifying certain aspects of the vehicle. In one particular aspect, the drive train can be modified between various settings. These settings can include a two-wheel drive setting, a four-wheel drive high setting and a four-wheel drive low setting. Controls are included within the passenger compartment so that the user of the vehicle can manipulate the drive train between these various settings.

SUMMARY OF THE DISCLOSURE

According to a first aspect of the present disclosure, a selection assembly includes a primary interface that is operable in at least two directions of movement. A user interface is incorporated within the primary interface and having a selector that is operable relative to the primary interface. The selector includes operative movement along a primary movement path to select between a first transmission setting and a second transmission setting. The selector includes a secondary movement path that deviates from the primary movement path. A combination of the primary movement path and the secondary movement path operate the selector between the second transmission setting and a third transmission setting.

According to another aspect of the present disclosure, a selection assembly for a vehicle includes a primary interface that is operable in at least two directions of movement. A user interface is incorporated within the primary interface and having a selector that is operable relative to the primary interface. The selector includes operative movement along a primary movement path to select between a two-wheel drive setting and a four-wheel drive high-speed setting. The selector includes a secondary movement path that deviates from the primary movement path. A combination of the primary movement path and the secondary movement path operates the slider of the user interface between the four-wheel drive high-speed setting and a four-wheel drive low-speed setting.

According to another aspect of the present disclosure, a transmission selector for a vehicle includes a stalk that is operable in at least two directions of movement. A selector is incorporated within the stalk that is selectively operable to define a two-wheel drive setting, a four-wheel drive high-speed setting and a four-wheel drive low-speed setting. A blocking feature selectively prevents operation of the slider between the four-wheel drive high-speed setting and the four-wheel drive low-speed setting. The selector includes operative movement along a primary movement path to select between the two-wheel drive setting and the four-wheel drive high-speed setting. The selector includes a secondary movement path that deviates from the primary movement path to disengage the blocking feature. Movement of the selector along the primary movement path and the secondary movement path, in combination, operates the selector between the four-wheel drive high-speed setting and a four-wheel drive low-speed setting.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein;

however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
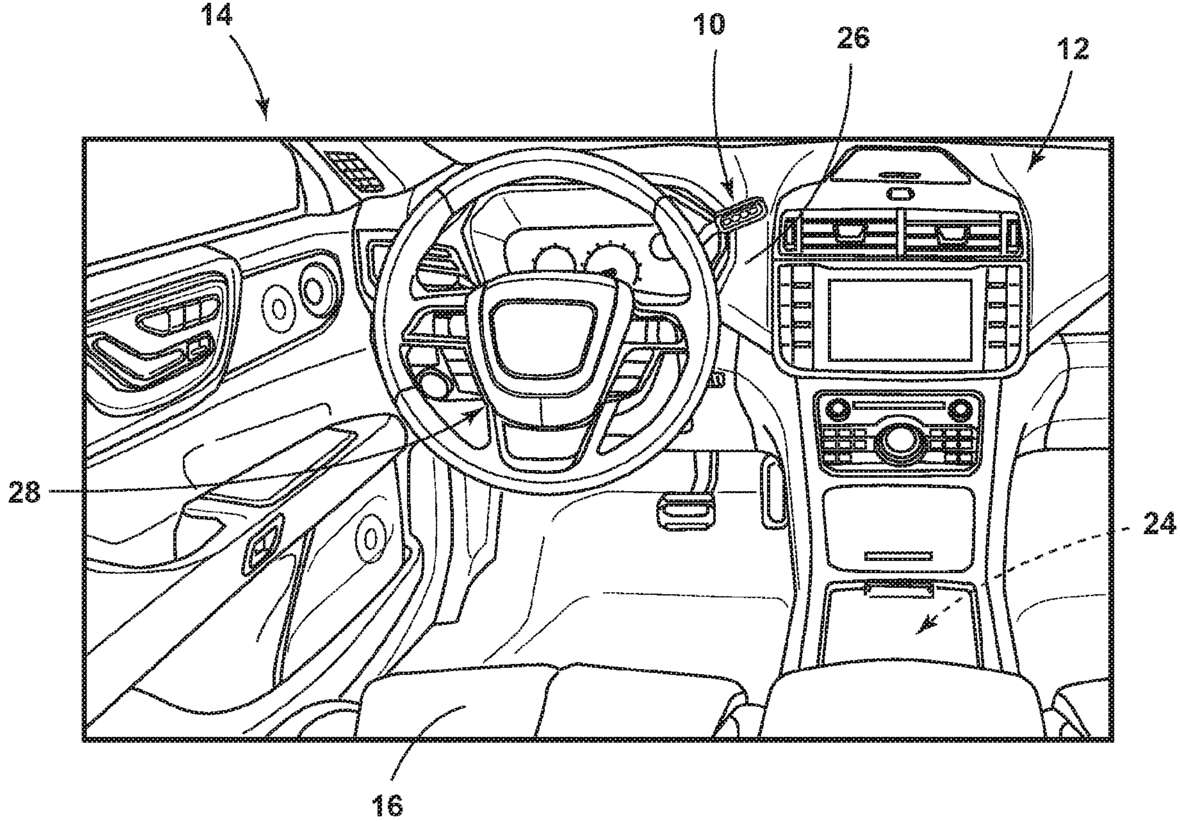
FIG. 1 is a perspective view of a passenger compartment of a vehicle and showing various user interface controls that incorporate aspects of a selection assembly.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a selection assembly for modifying the drive train 24 of a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-10, reference numeral 10 generally refers to a selection assembly that is incorporated within a passenger compartment 12 of a vehicle 14 and typically near a driver's seat 16 for the vehicle 14. The selection assembly 10 is used for modifying various settings for one or more devices that are incorporated within a vehicle 14. In certain aspects, these settings are related to a vehicle transmission or vehicle differential and include a first transmission setting, a second transmission setting and a third transmission setting. It is contemplated that the first transmission setting can include a two-wheel drive setting 18, the second transmission setting can include a four-wheel drive high-speed setting 20, and the third transmission setting can include a four-wheel drive low-speed setting 22. Operation of the selection assembly 10 in this regard modifies the drive train 24 to operate between these various settings for operating the vehicle 14.

According to various aspects of the device, the selection assembly 10 operates a drive train 24 or other components of a vehicle transmission and includes a primary interface 26, such as a stalk, a shifter, rotary dial 90, or other similar interface member, that is operable in at least two directions of operative movement. Generally, these directions of movement are oblique with respect to one another. In certain aspects of the device, these directions of movement are perpendicular or normal with respect to one another. These directions of movement can include up and down with respect to the steering column 28 as well as back and forth in a generally axial direction with respect to the steering column 28.

Referring again to FIGS. 1-10, a built-in user interface 30 is incorporated within the primary interface 26 and includes a selector 32 of the selection assembly 10 that is operable relative to the primary interface 26. The operative movement of the selector 32 is operable along a primary movement path 34 that can be used to select between the two-wheel drive setting 18 and the four-wheel drive high-speed setting 20. Additionally, operative movement of the selector 32 includes a secondary movement path 36 that deviates from the primary movement path 34. The combination of the primary movement path 34 and the secondary movement path 36 can be operated contemporaneously to operate the user interface 30 for selecting between the four-wheel drive high-speed setting 20 and the four-wheel drive low-speed setting 22. The secondary movement path 36 operates the selector 32 between a ready state 150 and an activated state 152. In the ready state 150, the selector 32 is able to be manipulated between the two-wheel drive setting 18 and the four-wheel drive high-speed setting 20. In the activated state 152, the selector 32 is moved along the secondary movement path 36 and is able to be manipulated between the four-wheel drive high-speed setting 20 and the four-wheel drive low-speed setting 22.

Figure 2:
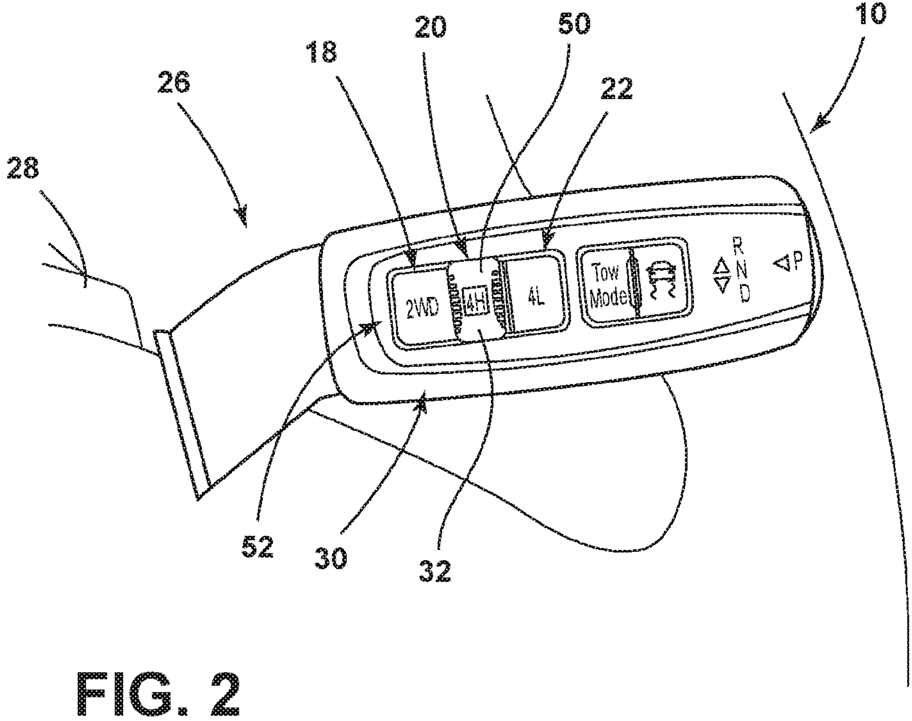
FIG. 2 is a perspective view of an aspect of a selection assembly in the form of a stalk that is mounted to a steering column of a vehicle.
Figure 3:
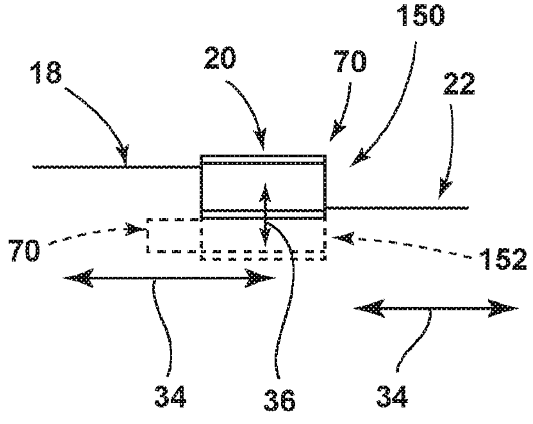
FIG. 3 is a schematic cross-sectional view of the selection assembly of FIG. 2, taken along line III-III.

Referring now to FIGS. 2 and 3, the user interface 30 that is incorporated within the primary interface 26 includes a slider 50 that is laterally operable relative to various surface indicia 52 of the primary interface 26. These indicia correspond to at least the two-wheel drive setting 18, the four-wheel drive high-speed setting 20 and the four-wheel drive low-speed setting 22. In this configuration, the slider 50 can be moved laterally along the primary movement path 34 between the two-wheel drive setting 18 and the four-wheel drive high-speed setting 20. When movement is desired between the four-wheel drive high-speed setting 20 and the four-wheel drive low-speed setting 22, the slider 50 can be pushed downward or otherwise depressed along the secondary movement path 36 and then slidably operated along the primary movement path 34. This combined movement of the primary movement path 34 and the secondary movement path 36 serves to operate the slider 50 between the four-wheel drive high-speed setting 20 and the four-wheel drive low-speed setting 22.

According to various aspects of the device, as disclosed herein, operation of the selector 32 between the two-wheel drive setting 18 and the four-wheel drive high-speed setting 20 can be performed frequently and at various speeds and under conditions that the vehicle 14 is operating. In addition, operation of the drive train 24 and other portions of the transmission between the two-wheel drive setting 18 and the four-wheel drive high-speed setting 20 typically engages and disengages various splines and similar linkages that are included within the drive train 24. Again, the engagement and disengagement of these splines can be performed at a wide range of speeds and operating conditions of the vehicle 14.

Where the drive train 24 is being moved between the four-wheel drive high-speed setting 20 and the four-wheel drive low-speed setting 22, gear ratios within the transmission are being operated such that shifting the drive train 24 between the four-wheel drive high-speed setting 20 and the four-wheel drive low-speed setting 22, while moving at a high rate of speed, is typically not desirable. Accordingly, movement of the selector 32 along the secondary movement path 36 can be used as a failsafe or blocking feature 70 for preventing operation of the drive train 24 to the four-wheel drive low-speed setting 22 when conditions of the vehicle 14 are not optimal for such modification. In this configuration, where a user desires to move the slider 50 between the four-wheel drive high-speed setting 20 and the four-wheel drive low-speed setting 22, movement of the slider 50 in the secondary movement path 36 may result in a blocking feature 70 of the user interface 30 to prevent movement of the slider 50 along the primary movement path 34 and toward the four-wheel drive low-speed setting 22. The blocking feature 70 can include an operable interface mechanism that physically and/or electromagnetically prevents the slider 50 or other aspect of the selector 32 from operating along the secondary movement path 36. In the case of an electromagnetic actuator, the blocking feature 70 can be a physical member that is operated through an electromagnetic or electromechanical mechanism.

According to the various aspects of the device, the blocking feature 70 can be coupled with a controller that activates and deactivates the blocking feature 70 based upon the performance of one or more protocols related to the status of the vehicle 14. These protocols can be a predefined set of vehicular protocols. By way of example and not limitation, the slider 50 can be activated to move from the four-wheel drive high-speed setting 20 to the four-wheel drive low-speed setting 22, and vice versa, when the vehicle 14 is stopped or traveling below a predetermined velocity. These protocols can also be related to an orientation of the vehicle 14. In such an aspect of the device, the blocking feature 70 may be unable to move from the four-wheel drive low-speed setting 22 and back to the four-wheel drive high-speed setting 20 when the vehicle 14 is in a slope having an incline that is above a certain threshold. In the various aspects of the device, where the designated protocols are met, the blocking feature 70 can be activated or deactivated to prevent or allow, respectively, operation of the slider 50 between various positions, such as the four-wheel drive high-speed setting 20 and the four-wheel drive low-speed setting 22.

Figure 4:
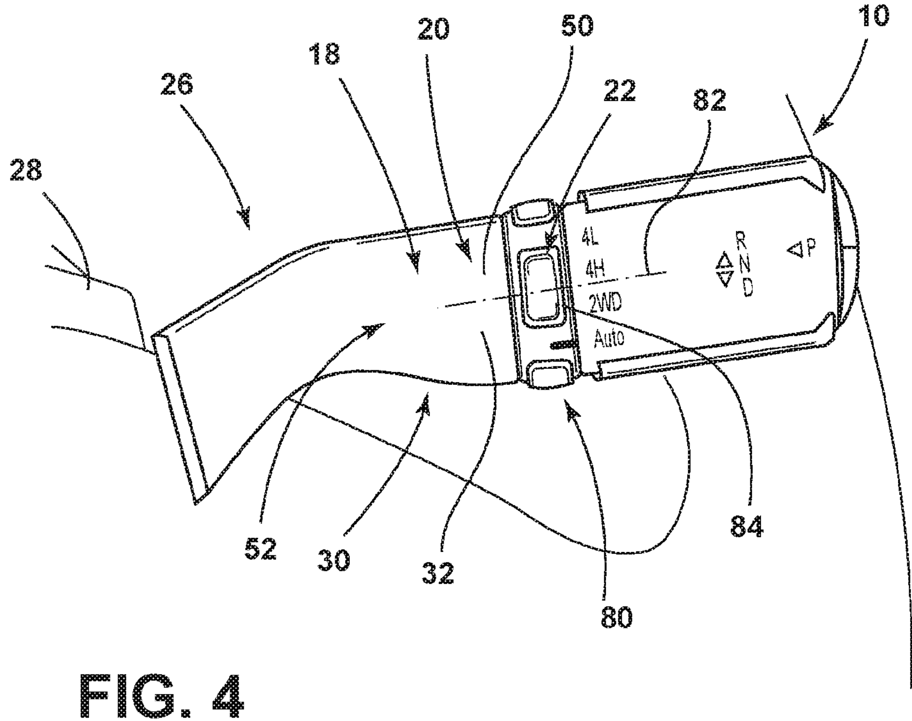
FIG. 4 is a perspective view of an aspect of a selection assembly in the form of a stalk that is mounted to a steering column of a vehicle.
Figure 5:
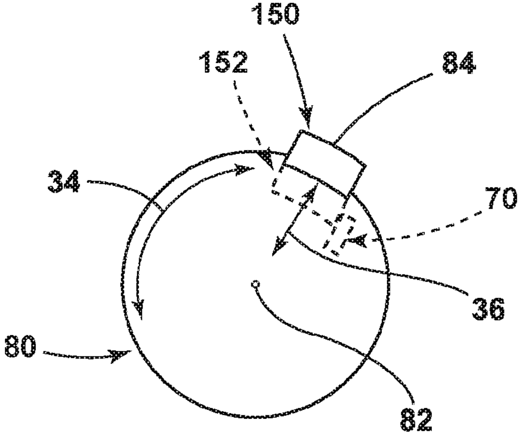
FIG. 5 is a schematic cross-sectional view of the selection assembly of FIG. 2, taken along line V-V.

Referring now to FIGS. 4 and 5, the primary interface 26 can include the user interface 30 that incorporates a rotary member 80 that operates about a rotational axis 82 of the primary interface 26 between the two-wheel drive setting 18 and the four-wheel drive high-speed setting 20. The user interface 30 can also include a button 84 that is operable through the secondary movement path 36 that can be used in combination with the rotary portion of the primary interface 26 to move the primary interface 26 between the four-wheel drive high-speed setting 20 and the four-wheel drive low-speed setting 22. The button 84 can be located on the rotary member 80 or can be positioned on a separate portion of the primary interface 26 that is stationary with respect to the rotary member 80.

As exemplified in FIG. 5, the button 84 incorporated within the selection assembly 10 operates along the secondary movement path 36 and in a direction that deviates from the primary movement path 34. In the illustrated aspect of the device, the primary movement path 34 is rotational about the rotational axis 82. Conversely, the secondary movement path 36 is in a radial direction relative to the rotational axis 82. It is contemplated that the secondary movement path 36 can also be an axial motion with respect to the rotational axis 82. Operation of the button 84 along the secondary movement path 36 can serve to engage a blocking feature 70 that can prevent movement of the rotary portion of the selection assembly 10 from moving to the four-wheel drive low-speed setting 22 until such time as conditions or protocols related to the vehicle 14 are met for such modification.

In various aspects of the device, the selection assembly 10, as shown in FIGS. 4 and 5, can include more than one button 84. In such an aspect of the device, each button 84 can have a dedicated secondary movement path 36 that corresponds to a dedicated operation of the selection assembly. Additionally, the direction, distance or magnitude of the secondary movement paths 36 for the buttons 84 can be different. Each button 84 can include a dedicated blocking feature 70 as well as dedicated protocols that must be met to activate and deactivate the respective button 84 of the selection assembly. By way of example and not limitation, one of the buttons 84 can be used to operate the transmission between the four-wheel drive high-speed setting 20 and the four-wheel drive low-speed setting 22. The other of the buttons 84 can be used for some other operation, such as a park lock, placing the transmission in a manual shift condition, or some other operational configuration.

Figure 6:
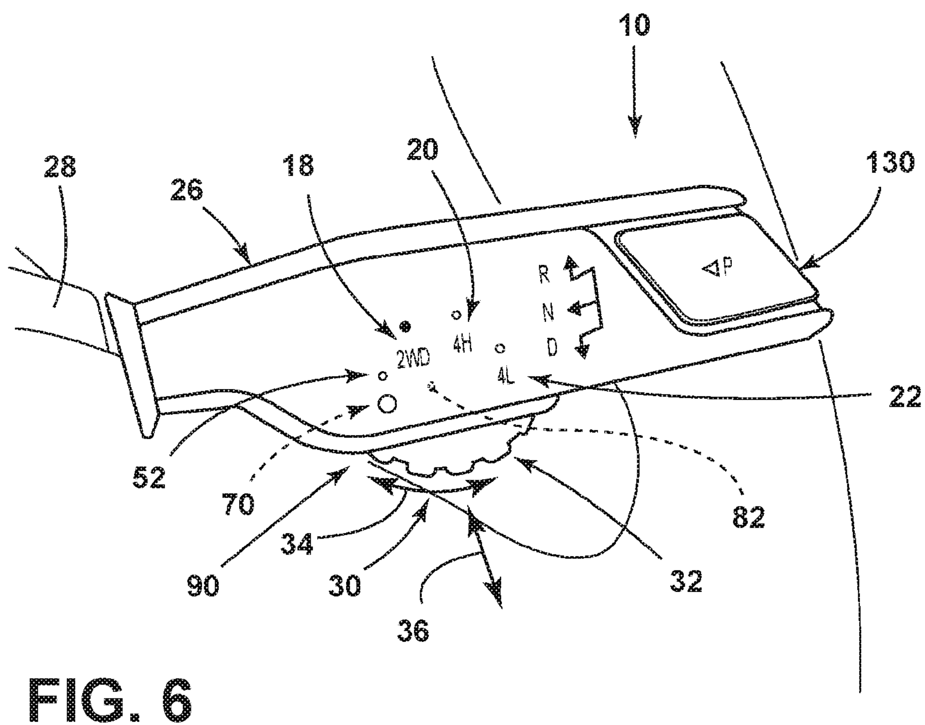
FIG. 6 is a perspective view of an aspect of a selection assembly in the form of a stalk that is mounted to a steering column of a vehicle.
Figure 7:
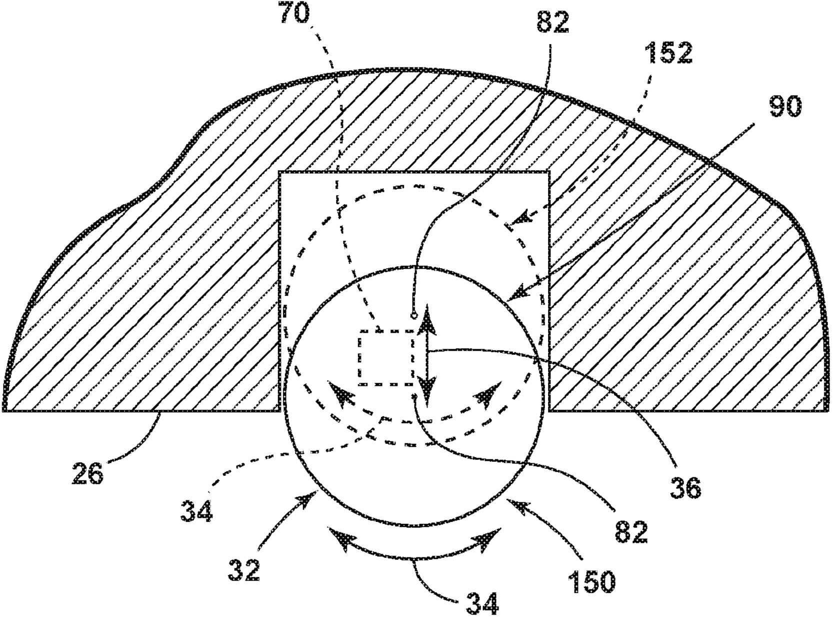
FIG. 7 is a schematic cross-sectional view of the selection assembly of FIG. 2, taken along line VII-VII.

Referring now to FIGS. 6 and 7, the selection assembly 10 can include a rotary dial 90 that can be rotated in a rotary motion about a rotational axis 82 to operate the selection assembly 10 between the two-wheel drive setting 18 and the four-wheel drive high-speed setting 20. Where the user desires to manipulate the drive train 24 between the four-wheel drive high-speed setting 20 and the four-wheel drive low-speed setting 22, the rotary dial 90 can be pressed inward in a generally lateral motion and into the primary interface 26 or otherwise depressed or deflected into the primary interface 26. This lateral motion defines a deflected secondary position of the selector 32 that moves the rotary dial 90 and the rotational axis 82. This lateral motion of the rotary dial 90 allows for rotation of the rotary dial 90 toward the four-wheel drive low-speed setting 22. In this aspect of the device, the primary movement path 34 is a rotation of the rotary dial 90 about the rotational axis 82. The secondary movement path 36 is a generally linear or radial deflection of the rotary dial 90 that also moves the rotational axis 82 of the rotary dial 90 in a generally linear or lateral motion.

Referring again to FIGS. 2-7, manipulation of the selector 32 along the primary movement path 34 serves to operate the drive train 24 to engage and disengage various splines for moving the drive train 24 between the two-wheel drive setting 18 and the four-wheel drive high-speed setting 20. Manipulation of the selector 32 in the secondary movement path 36 serves to activate a gear-ratio component of the drive train 24 that is used to manipulate the drive train 24 between the four-wheel drive high-speed setting 20 and the four-wheel drive low-speed setting 22. Accordingly, manipulation of the selector 32 through the primary movement path 34 and the secondary movement path 36 serves to operate both of these assemblies contemporaneously to shift the gear ratio setting of the drive train 24 for operating the vehicle 14. As discussed herein, manipulation of the drive train 24 between the two-wheel drive setting 18 and the four-wheel drive high-speed setting 20 operates to engage and disengage a four-wheel drive linkage without changing the gear ratios for operating the vehicle 14.

As exemplified in FIGS. 1-7, wherein the primary interface 26 is in the form of a stalk, positioning of the selector 32 of the user interface 30 within the stalk attached to the steering column 28 provides convenient access to the user for manipulating the setting of the drive train 24 for the vehicle 14. In this configuration, the user can quickly manipulate the selector 32 of the user interface 30 without moving their hands far from the steering wheel for the vehicle 14.

As discussed herein, operation of the selector 32 can be used to prevent inadvertent adjustment of the selector 32 between the four-wheel drive high-speed setting 20 and the four-wheel drive low-speed setting 22. The requirement for moving the selector 32 through the primary movement path 34 as well as the secondary movement path 36 typically requires a deliberate operation of the user interface 30. Accordingly, inadvertent or accidental manipulation of the selector 32 into the four-wheel drive low-speed setting 22 can be prevented.

As discussed herein, operation of the selector 32 can include the primary movement path 34 and the secondary movement path 36 that deviate from one another. These movements can be perpendicular with respect to one another, as generally illustrated in FIG. 2. As exemplified in FIGS. 3 and 4, the primary movement path 34 can be an arcuate motion around a particular rotational axis 82. The secondary movement path 36 can be a radial motion or linear motion that operates toward and away from the rotational axis 82 of the selector 32. It is contemplated that other combinations of movements can be utilized to operate the primary movement path 34 and secondary movement path 36, where these movement paths deviate from one another to require the composite movements for moving the drive train 24 between the four-wheel drive high-speed setting 20 and four-wheel drive low-speed setting 22.

Figure 8:
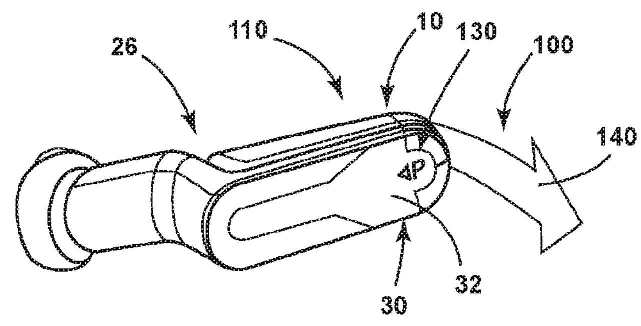
FIG. 8 is a schematic perspective view of an aspect of a selection assembly and showing operation of the selection assembly in a first direction.
Figure 9:
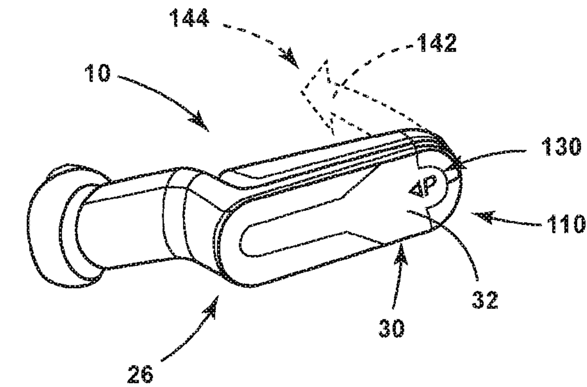
FIG. 9 is a schematic perspective view of the selection assembly of FIG. 8 and showing operation of the selection assembly in a second direction.
Figure 10:
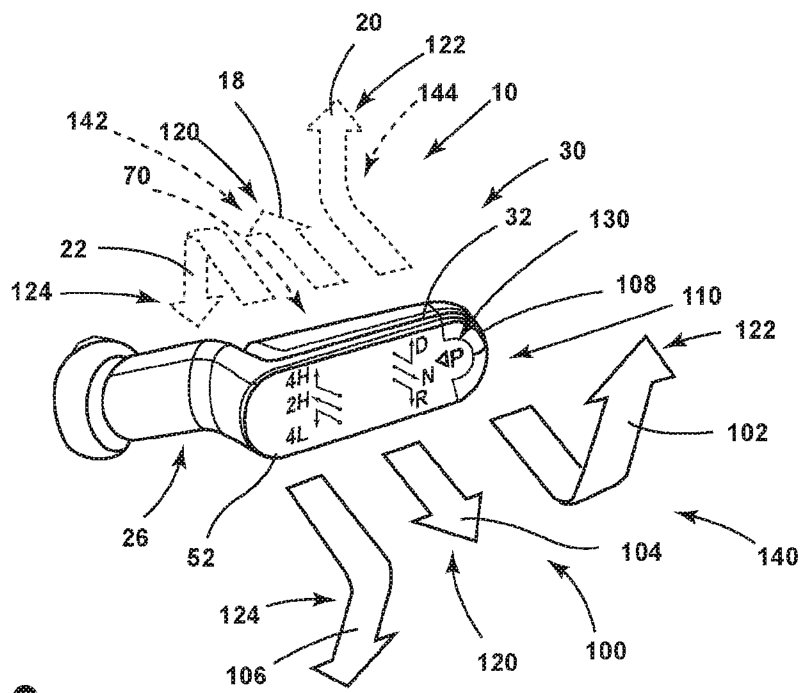
FIG. 10 is a schematic perspective view of the selection assembly of FIG. 8 and showing operation of the selection assembly through a plurality of selection positions.

Referring now to FIGS. 8-10, the primary interface 26 is operable relative to the steering column 28 in multiple directions. The use of the multi-direction operation of the primary interface 26 can be used to provide shifting functions for a gear selector 100 as well as the selection assembly 10 for the drive train 24. The gear selector 100 can be utilized when the primary interface 26 is moved in a first direction 140, such as toward the user. Using the gear selector 100, the user can modify the transmission between a plurality of gear settings. The gear settings can include drive 102, neutral 104 and reverse 106. In some aspects of the device, a park setting 108 can also be included. By operating the primary interface 26 in a second direction 142, typically a direction that opposes the gear selector 100, the user can switch the functionality of the primary interface 26 from the gear selector 100 and the selection interface 144 for the drive train 24. The primary interface 26, in a rest position 110, lies between the gear selector 100 and the selection interface 144.

Referring again to FIGS. 8-10, when the user operates the primary interface 26 in the first direction 140 relative to the steering column 28, the primary interface 26 can be operated from a central position 120 that is indicative of neutral 104 and between an upper position 122 and a lower position 124 that are indicative of drive 102 and reverse 106, respectively. When the primary interface 26 is moved in the second direction 142 to engage the selection assembly 10, the primary interface 26 can be moved between the central position 120 that is indicative of the two-wheel drive setting 18, and between an upper position 122 and lower position 124 that are indicative of the four-wheel drive high-speed setting 20 and the four-wheel drive low-speed setting 22, respectively. To move the primary interface 26 into the four-wheel drive low-speed setting 22, it is contemplated that a separate blocking feature 70 can be incorporated within the primary interface 26, to ensure that an intentional movement is used to move the primary interface 26 into the two-wheel drive setting 18. Using the blocking feature 70, the primary interface 26 can be conveniently manipulated between the two-wheel drive setting 18 and the four-wheel drive high-speed setting 20 by moving the primary interface 26 between the upper position 122 and the central position 120. These movements can be accomplished without inadvertently moving the primary interface 26 into the lower position 124 that is indicative of the four-wheel drive low-speed setting 22, without first disengaging the blocking feature 70 of the selection assembly 10.

According to the various aspects of the device described herein, it is contemplated that the selection assembly 10 can include a dedicated park interface 130 that is used to engage the park setting 108, as well as a park lock for maintaining the vehicle 14 in a parked position when desired. This feature can be used to both engage and disengage the park setting 108 when needed for parking the vehicle 14 or for preparing the vehicle 14 to be operated.

According to the various aspects of the device, the selection assembly 10 can be incorporated in any one of various stalk configurations. These configurations can include a turn-signal stalk, a gear shift stalk, a wiper stalk and others. It is also contemplated that the selection assembly 10 can be incorporated into a dedicated stalk that is used to modify the gear train.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A selection assembly for a vehicle, the selection assembly comprising:

a primary interface that is operable in at least two directions of movement; and a user interface incorporated within the primary interface and having a selector that is operable relative to the primary interface, wherein, the selector includes operative movement along a primary movement path to select between a first transmission setting and a second transmission setting;

the selector includes a secondary movement path that deviates from the primary movement path; and a combination of the primary movement path and the secondary movement path operate the selector between the second transmission setting and a third transmission setting, wherein the first transmission setting is a two-wheel drive setting, the second transmission setting is a four-wheel drive high-speed setting, and the third transmission setting is a four-wheel drive low-speed setting.

2. The selection assembly of claim 1, wherein the primary interface is a stalk that is operatively attached to a steering column.

3. The selection assembly of claim 1, wherein the primary movement path of the selector includes a rotary motion that operates about a rotational axis, and wherein the secondary movement path is one of an axial motion and a radial motion with respect to the rotational axis.

4. The selection assembly of claim 3, wherein the secondary movement path is defined by a lateral motion of the selector that translates the rotational axis to a deflected secondary position.

5. The selection assembly of claim 1, wherein the primary movement path is a laterally slidable motion, and wherein the secondary movement path is one of perpendicular and oblique with respect to the primary movement path.

6. The selection assembly of claim 1, wherein the secondary movement path is defined between a ready state and an activated state, and wherein the selector is biased toward the ready state.

7. The selection assembly of claim 6, wherein the selector includes a blocking feature that selectively prevents operation of the selector along the secondary movement path, and wherein the blocking feature provides for selective operation of the selector when a predefined set of vehicular protocols are performed.

8. The selection assembly of claim 7, wherein the blocking feature includes an operable interface mechanism that maintains the selector in the ready state, and wherein the operable interface mechanism includes an electromagnetic actuator that is coupled to a controller.

9. A selection assembly for a vehicle, the selection assembly comprising:

a primary interface that is operable in at least two directions of movement; and a user interface incorporated within the primary interface and having a selector that is operable relative to the primary interface, wherein, the selector includes operative movement along a primary movement path to select between a two-wheel drive setting and a four-wheel drive high-speed setting;

the selector includes a secondary movement path that deviates from the primary movement path; and a combination of the primary movement path and the secondary movement path operates the selector of the user interface between the four-wheel drive high-speed setting and a four-wheel drive low-speed setting.

10. The selection assembly of claim 9, wherein the primary interface is a stalk that is operatively attached to a steering column.

11. The selection assembly of claim 9, wherein the primary movement path of the selector includes a rotary motion that operates about a rotational axis, and wherein the secondary movement path is one of an axial motion and a radial motion with respect to the rotational axis.

12. The selection assembly of claim 9, wherein the primary movement path is a laterally slidable motion, and wherein the secondary movement path is one of perpendicular and oblique to the primary movement path.

13. The selection assembly of claim 9, wherein the secondary movement path is defined between a ready state and an activated state, wherein the selector is biased toward the ready state.

14. The selection assembly of claim 13, wherein the selector includes a blocking feature that selectively prevents operation of the selector along the secondary movement path, wherein the blocking feature includes an operable interface mechanism that maintains the selector in the ready state.

15. The selection assembly of claim 14, wherein the operable interface mechanism includes an electro-magnetic actuator that is coupled to a controller.

16. A transmission selector for a vehicle, the transmission selector comprising:

a stalk that is operable in at least two directions of movement;

a selector incorporated within the stalk that is selectively operable to define a two-wheel drive setting, a four-wheel drive high-speed setting and a four-wheel drive low-speed setting; and a blocking feature that selectively prevents operation of the selector between the four-wheel drive high-speed setting and the four-wheel drive low-speed setting, wherein, the selector includes operative movement along a primary movement path to select between the two-wheel drive setting and the four-wheel drive high-speed setting;

the selector includes a secondary movement path that deviates from the primary movement path to disengage the blocking feature; and movement of the selector along the primary movement path and the secondary movement path, in combination, operates the selector between the four-wheel drive high-speed setting and the four-wheel drive low-speed setting.

17. The transmission selector of claim 16, wherein the stalk is a primary interface that is operatively attached to a steering column.

18. The transmission selector of claim 16, wherein the primary movement path of the selector includes a rotary motion that operates about a rotational axis and wherein the secondary movement path operates with respect to the rotational axis and is different than the primary movement path.

19. The transmission selector of claim 16, wherein the primary movement path is a laterally slidable motion that is different than the secondary movement path.

20. The transmission selector of claim 16, wherein the secondary movement path is defined between a ready state and an activated state, wherein the selector is biased toward the ready state, and wherein the blocking feature includes an operable interface mechanism that maintains the selector in the ready state.

* * * * *